United States Patent [19]

Eugster et al.

[11] 4,332,588
[45] Jun. 1, 1982

[54] DISPERSE DYE STABLE TO DYEING, AND ITS USE FOR DYEING AND PRINTING SYNTHETIC AND SEMI-SYNTHETIC FIBRE MATERIALS

[75] Inventors: Peter Eugster, Arlesheim; Stefan Koller, Ramlinsburg, both of Switzerland

[73] Assignee: Ciba-Geigy Corporation, Ardsley, N.Y.

[21] Appl. No.: 221,597

[22] Filed: Dec. 31, 1980

[30] Foreign Application Priority Data

Jan. 11, 1980 [CH] Switzerland .................... 212/80

[51] Int. Cl.$^3$ ............... D06P 67/02; C09B 27/00
[52] U.S. Cl. ............................... 8/526; 8/662; 260/207.5; 260/208
[58] Field of Search ............... 8/526, 662; 260/207, 208

[56] References Cited

U.S. PATENT DOCUMENTS

| | | | |
|---|---|---|---|
| 2,007,382 | 7/1935 | Ockman et al. | 8/501 |
| 3,407,189 | 10/1968 | Merian | 260/207.1 |
| 4,074,965 | 2/1978 | Kruse et al. | 8/662 |
| 4,099,909 | 7/1978 | Koller et al. | 8/662 |

FOREIGN PATENT DOCUMENTS 2536052  2/1977  Fed. Rep. of Germany .
2921210 12/1980  Fed. Rep. of Germany .
1543316  4/1979  United Kingdom .

Primary Examiner—A. Lionel Clingman
Attorney, Agent, or Firm—Edward McC. Roberts

[57] ABSTRACT

By the slow stepwise heating up of an aqueous suspension of the crystallographically amorphous dye of the formula

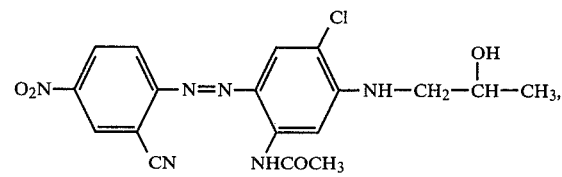

which dye is unstable to dyeing, to a temperature of 90°–100° C. with a halting point at 40°–60° C., this dye can be transformed completely into the crystalline α-modification.

The novel dye modification can be easily converted, without increase of viscosity, into thinly liquid formulations which are readily pourable, which form no sediment, and which are excellently suitable for producing printing pastes, for example for printing polyester fabric.

6 Claims, 1 Drawing Figure

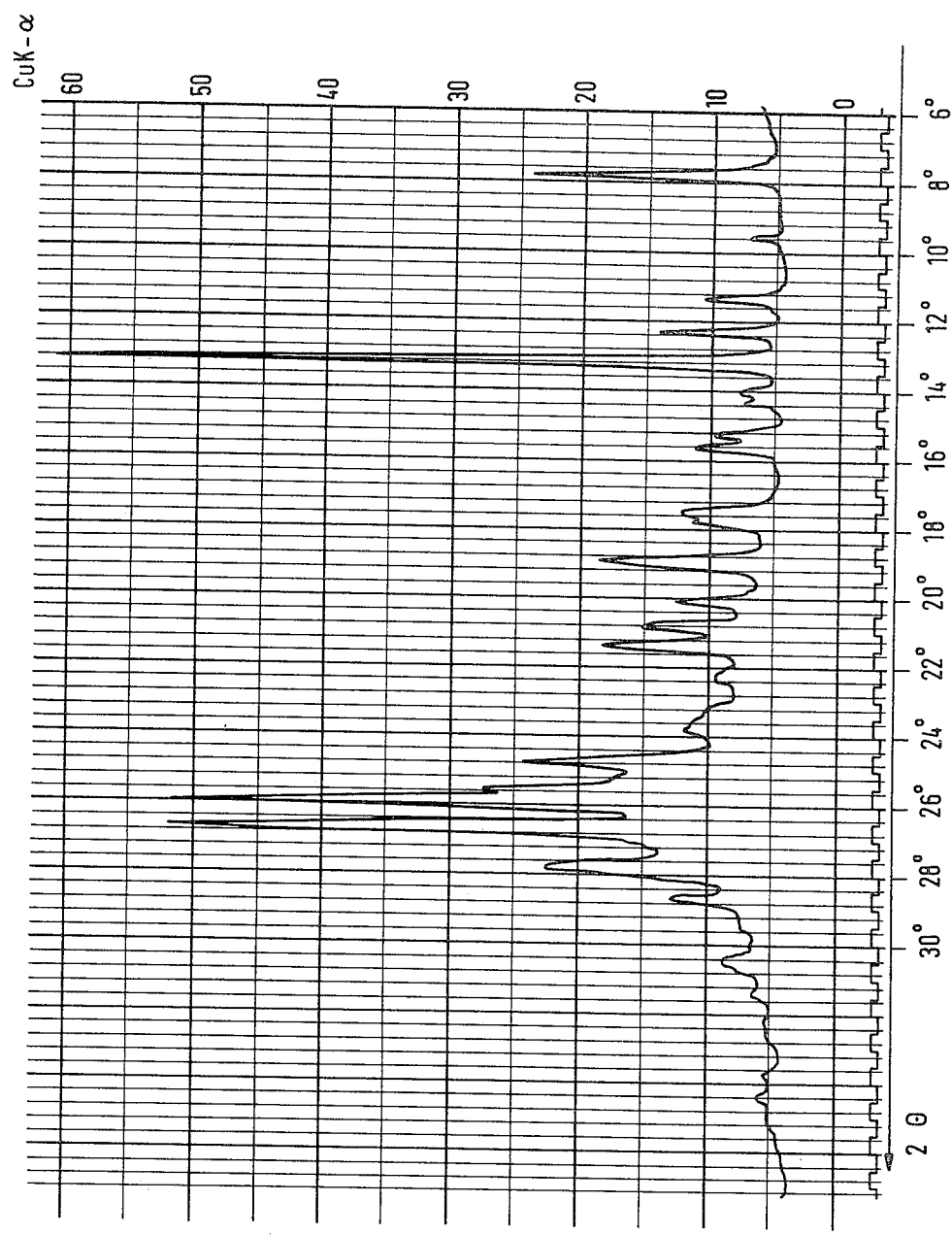

DISPERSE DYE STABLE TO DYEING, AND ITS USE FOR DYEING AND PRINTING SYNTHETIC AND SEMI-SYNTHETIC FIBRE MATERIALS

The present invention relates to a novel crystallographic modification of the azo dye of the formula

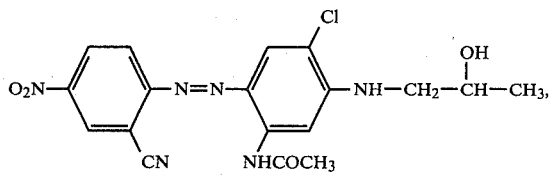

which modification is stable to dyeing and is characterised by the X-ray diffraction pattern with the characteristic reflexes, taken with CuK-α1 radiation and shown in FIG. 1, and by the d values of the interplanar spacings, calculated from the diffraction pattern, whereby in the following only the lines of very strong (vs) and strong (s) relative intensity are taken into account:

d [Å] 11.9 (s), 6.8 (vs), 4.71 (s), 4.17 (s), 3.60 (s), 3.49 (s), 3.44 (vs), 3.34 (vs) and 3.21 (s).

The crystallographically amorphous modification of the dye of the aforementioned formula, with a softening range of below 90° C., and its use for dyeing and printing textile material, particularly polyester fibre material, are known. The dye can be produced, using the process known from the Swiss Patent Specification No. 561,756, by the coupling of diazotised 2-cyano-4-nitro-aniline with 1-[N-(β-hydroxypropyl)-amino]-2-chloro-5-acetyl-amino-benzene.

The novel modification stable to dyeing of the present invention, designated in the following as the α-modification, is obtained by heating the amorphous dye in an aqueous suspension, optionally with the addition of an anionic dispersing agent, for 1 to 20 hours at a temperature of between 20° to 100° C. in a manner ensuring that the dye particles do not melt. It is advantageous in this process to start directly with the aqueous coupling suspension of the azo dye.

The transformation of the amorphous dye into the crystalline dye can be easily followed by taking X-ray diffraction spectra and determining melting points. The suspension of the amorphous dye is advantageously heated gradually to 90° to 100° C. with a halting point at 40°–60° C., without the dye melting during the process. The rate of heating is advantageously 0.1°–1° C. per minute, preferably 0.4°–0.7° C. per minute, and the time at the arrest point at 40°–60° C., preferably 50° C., is 0.5 to 2 hours. The suspension is held in the region of the final temperature of 90°–100° C. for 0.5–5 hours. The amorphous dye converts as a result of this procedure completely into the crystalline α-modification, which, after cooling of the suspension, can be easily filtered off and subjected to a known finishing operation.

To obtain dye preparations which are technically suitable for dyeing and printing, the α-modification according to the invention can be converted into a finely divided form by the usual mechanical processes, optionally in the presence of water and of suitable dispersing agents and other customary additives. The normal type of devices, such as mills, for example ball mills, vibratory mills, sand mills or kneaders, can be used for the fine division of the α-modification optionally to the performed. Suitable dispersing agents are for example condensation products of mono- or polynuclear aromatic compounds, such as naphthalene, naphthols, phenols or sulfonic acids thereof, with formaldehyde or with other substances which can condense with aromatic rings, such as urea, ethylene oxide or isocyanates, optionally with the addition of sodium sulfite, also lignin sulfonates and nonionic and anionic surface-active compounds.

The novel dye modification converted into a finely divided form is particularly suitable for producing storage-stable liquid formulations having a low content of dispersing agents. In contrast to corresponding formulations produced with the amorphous dye, those obtained by the use of the novel crystalline dye modification are thinly liquid, readily pourable, form no sediment and are stable in dispersion and in storage, and are therefore excellently suitable for producing printing pastes, for example for printing polyester fabric.

Except where otherwise stated in the Examples which follow, the term 'parts' denotes parts by weight.

FIGURE: X-ray diffraction pattern of stable dyestuff modification.

The X-ray diffraction pattern was taken with CuK-α1 radiation ($\lambda = 1.5405$ Å). The calibration substance used was α-quartz, the d values of which are calculated from $a = 4.913$ Å and $c = 5.405$ Å. The relative line intensities were estimated visually.

EXAMPLE 1

The coupling suspension of the amorphous azo dye, obtained by coupling 74 parts of diazotised 2-cyano-4-nitroaniline with 95 parts of 1-[N-(β-hydroxypropyl)amino]-2-chloro-5-acetylaminobenzene, is neutralised with a caustic solution to a pH valve of 1.6–1.7, and firstly stirred overnight at room temperature. The suspension is then heated at a heating rate of 0.5° C./min. to 50° C., and this temperature is maintained constant for 1 hour. The temperature is subsequently raised at the same rate as before to 95°–100° C., and the suspension is stirred for a further 2 hours at this temperature. The suspension is afterwards allowed to cool to 60°–70° C., and the dye, now crystalline and in the α-modification, is filtered off. The dye crystals, which can be easily filtered off, are washed on the suction filter with water at 50° C. until neutral, and are then dried by suction. The moist filter cake is finally dried at 70°–80° C. in vacuo.

m.p.: 152°–155° C. (uncorr.).

UV: $\lambda_{max}^{MeOH}$ 515 nm (34.500).

EXAMPLE 2

400 parts of the crystalline disperse dye produced according to Example 1, 10 parts of a sulfonated, fractionated Kraft lignin having a ratio of carbon to organically bound sulfur of 46:1, and which consists to the extent of 80% of molecules having a molecular weight of between 2000 and 30,000, and 20 parts of a nonionic polycondensation product consisting of 20% of polypropylene oxide and 80% of polyethylene oxide having a molecular weight of about 16,500 are stirred in a dispersing medium consisting of 398 parts of water, 170 parts of 1,2-propylene glycol and 2 parts of the preservative 1-(3-chloroallyl)-3,5,7-triazoazonium-adamantane chloride.

The dispersion is ground in a stirrer mill by means of zirconium oxide grinding elements until the primary particle size of the major part of the dye particles is below 5μ, and the ground material is then separated from the grinding elements and de-aerated. The viscosity of the dispersion is 120 cP, and this value is raised to between 500 and 1000 cP by addition of 0.1–0.2% by weight of xanthane rubber followed by several hours' stirring. The pH value is 9.4. There is thus obtained a dye preparation which is thinly liquid, which can be easily filtered, and which undergoes, even after being stored for several weeks at 60° C. or being kept for several months at varying room temperatures, only insignificant changes with respect to its viscosity and its degree of dispersion.

The same result is obtained when the dispersion is ground in a bead mill or sand mill.

When this dye preparation is mixed together with a polyacrylic acid printing thickening, there results a printing paste of which the viscosity remains virtually unchanged even after 3 months, and which is suitable in particular for direct printing on polyester fabric.

EXAMPLE 3

50 parts of the red dye preparation obtained according to Example 2 are stirred into 950 parts of a 0.3% solution of a high-molecular polyacrylic acid in distilled water, the pH value of the solution having being adjusted with sodium lye to 6.8, and the mixture is well homogenised. The result is a printing paste having a viscosity of 33,000 cP (Brookfield viscosimeter RVT, spindle 4, 6 r.p.m. at 20° C. This printing paste is subsequently used to print on a rotary screen printing machine a polyester woven or knitted fabric. Pre-drying is then carried out at 100°–140° C. and the dried woven or knitted fabric is afterwards fixed in high-temperature steam for 8 minutes at 180° C. Instead of subjecting the material to this high-temperature steam treatment, it can be subjected also to a dry fixing treatment for one minute at 200°–210° C. After the fixing stage, the textile web is washed briefly at 20°–50° C. in a winch vat or on a continuous washing plant. By virtue of the good solubility of the thickening agent, the minimal amount of synthetic thickening used and also the very small amount of unfixed dye can be easily and quickly removed cold to lukewarm from the fabric.

Brilliant, deeply coloured, ruby red shades having good fastness to washing, water and rubbing are obtained. The degree of fixing of the dye is above 98%.

What is claimed is:

1. A modification of the dye of the formula

which modification is stable to dyeing and is characterised by the X-ray diffraction pattern (CuK-α-radiation) with the characteristic reflexes shown in FIG. 1, and by the d values of the interplanar spacings, calculated from the diffraction pattern:

d [Å]: 11.5 (s), 6.8 (vs), 4.71 (s), 4.17 (s), 3.60 (s), 3.49 (s), 3.44 (vs), 3.34 (vs) and 3.21 (s).

2. A process for producing the α-modification stable to dyeing according to claim 1, which process comprises heating the crystallographically amorphous dye of the given formula in an aqueous suspension for 1 to 20 hours at a temperature of between 20° and 100° C. in a manner ensuring that the dye particles do not melt.

3. A process according to claim 2, wherein the amorphous dye of the stated formula is gradually heated to 90°–100° C., with a halting point at 40°–60° C., and a heating rate of 0.1°–1° C. per minute, the period of time at the halting point being 0.5–2 hours, and at the final point 0.5–5 hours.

4. A process according to claim 3, wherein the halting point is at 50° C. and the heating-up rate is 0.4°–0.7° C. per minute.

5. A process according to any one of claims 2–4, wherein as starting material there is used directly the aqueous coupling suspension occurring in the production of the amorphous dye.

6. A process for dyeing and printing synthetic or semi-synthetic fibre materials by the use of printing pastes obtained by application of the α-modification of the azo dye according to claim 1, which modification is stable to dyeing.

* * * * *